United States Patent [19]

Kirts

[11] 4,339,930
[45] Jul. 20, 1982

[54] CONTROL SYSTEM FOR SOLAR-ASSISTED HEAT PUMP SYSTEM

[75] Inventor: Richard E. Kirts, Oxnard, Calif.

[73] Assignee: The United States of America as represented by the Secretary of the Navy, Washington, D.C.

[21] Appl. No.: 165,817

[22] Filed: Jul. 3, 1980

[51] Int. Cl.³ .......................... F24J 3/02; F25B 29/00; F25B 27/00
[52] U.S. Cl. ..................................... 62/235.1; 165/58; 165/18; 165/29; 126/427; 126/419; 62/238.6; 62/304
[58] Field of Search ............ 237/2 B; 62/324.1, 238.6, 62/235.1, 304; 165/18, 58, 29; 126/400, 427, 419

[56] References Cited

U.S. PATENT DOCUMENTS 4,165,036  8/1979  Meckler .............................. 237/2 B
4,190,199  2/1980  Cawley et al. ...................... 237/2 B Primary Examiner—Albert J. Makay
Assistant Examiner—Henry Bennett
Attorney, Agent, or Firm—Robert F. Beers; Joseph M. St.Amand

[57] ABSTRACT

A control system for a solar-assisted heating and cooling system including a solar collector system, a thermal storage system, a water-to-air heat pump, a water-to-air heat exchanger, a domestic water heater, and a cooling tower. The preferred embodiment of the controller of the present invention includes a first temperature sensing means for sensing the temperature of the collector fluid at the outlet of the solar collector system, a second temperature sensing means for sensing the temperature of the storage fluid at the thermal storage system, and a third temperature sensing means for sensing the temperature of the inlet water to the domestic water heater. The controller energizes or deenergizes a collector fluid circulation pump and activates valve means to circulate the collector fluid between the collector system and the thermal storage system or the domestic water heater based on the temperature of the three sensors to provide efficient operation of the solar energy collection process. The controller compares the temperature of the thermal storage fluid with three control temperatures which define four temperature ranges. The controller, based on the temperature range in which the temperature of the thermal storage fluid falls, whether the system is in the heating or cooling mode, and whether there is a demand for heating or cooling automatically controls the thermal storage system, the heat pump, the heat exchanger, the cooling tower, and the connections therebetween to provide increased efficiency.

10 Claims, 3 Drawing Figures

CONTROL SYSTEM FOR SOLAR-ASSISTED HEAT PUMP SYSTEM

BACKGROUND OF THE INVENTION

This invention relates in general to heating and cooling systems for buildings and, in particular, to a control system for a solar-assisted heat pump heating and cooling system.

Widespread use of solar-assisted heat pumps, solar powered chillers, heat-of-earth heat pumps, and other developing heating and cooling systems will depend upon their demonstrated cost effectiveness, reliability, and ease of operation. The control systems designed for these devices will influence cost effectiveness through their effects on first cost, maintenance cost, and system operating efficiency. System reliability and ease of operation are also directly related to control system design. Consequently, the development of low cost, reliable controls is an important aspect of the development of new building heating and cooling systems.

SUMMARY OF THE INVENTION

It is therefore the primary object of the present invention to provide a simple, low-cost, reliable controlling device which provides efficient and automatic operation of a solar-assisted heating and cooling system including a solar collector system, a thermal storage system, a water-to-air heat pump, a water-to-air heat exchanger, and a domestic water heater.

The preferred embodiment of the controller of the present invention includes a first temperature sensing means for sensing the temperature of the collector fluid at the outlet of the solar collector system, a second temperature sensing means for sensing the temperature of the storage fluid at the thermal storage system, and a third temperature sensing means for sensing the temperature of the inlet water to the domestic water heater. The controller energizes or deenergizes a collector fluid circulation pump and activates valve means to circulate the collector fluid between the collector system and the thermal storage system or the domestic water heater based on the temperature of the three sensors to provide efficient operation of the solar energy collection process. The controller compares the temperature of the thermal storage fluid with three control temperatures which define four temperature ranges. The controller, based on the temperature range in which the temperature of the thermal storage fluid falls, whether the system is in the heating or cooling mode, and whether there is a demand for heating or cooling (i.e., the temperature of the area to be heated or cooled is below or above the selected temperature, respectively) automatically controls the thermal storage system, the heat pump, the heat exchanger, and the connections therebetween to provide increased efficiency.

Other objects, advantages, and features of the invention will become apparent from the following description of the preferred embodiment taken in conjunction with the accompanying drawing wherein:

DESCRIPTION OF THE PREFERRED EMBODIMENT

Figure 1:
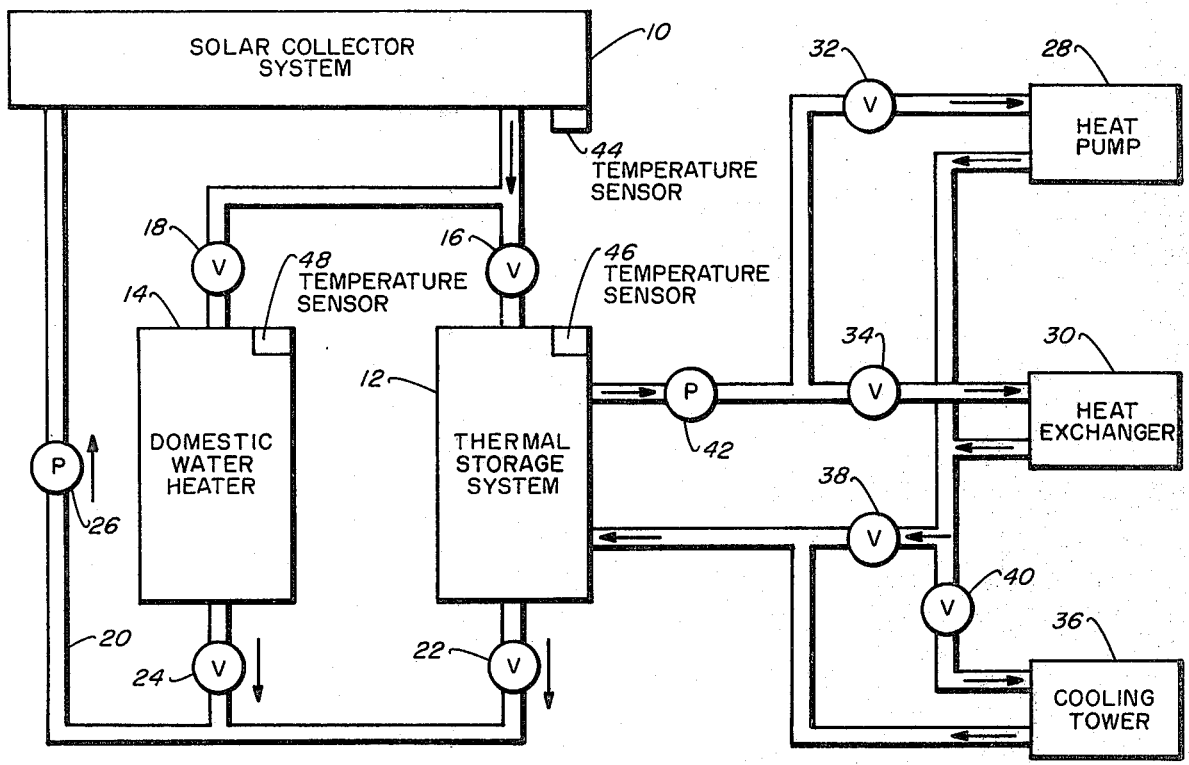
FIG. 1 is a diagram of a solar-assisted heat pump system of the type controlled by the control system of the present invention.

The control system of the present invention is intended to control a solar-assisted heat pump system having the fluid flow illustrated in the schematic drawing of FIG. 1. The solar-assisted heat pump system includes two fluid circulation paths, a solar energy collection loop and a heating, ventilation, and air conditioning loop (HVAC loop). The solar energy collection loop includes a solar energy collector system 10 for heating a fluid such as water from radiant solar energy. The collector water is coupled through suitable piping from the solar collector system 10 to either a thermal storage system 12 or to a domestic water heater 14. A first solenoid valve 16 controls the flow from the collector 10 to the thermal storage system 16 while a second solenoid valve 18 controls the flow from the collector to the domestic water heater 14. Return piping 20 completes the solar energy collection loop from the thermal storage system 12 or the domestic water heater 14 through a third solenoid valve 22 or a fourth solenoid valve 24, respectively. A collector circulation pump is provided in the solar collection loop such as pump 26 in the return piping 20 to circulate the fluid through the path.

The heating, ventilating and air conditioning loop includes a water-to-air heat pump 28 and a water-to-air heat exchanger 30 which are coupled to receive fluid from the thermal storage system 12 via a fifth solenoid valve 32 and a sixth solenoid valve 34, respectively. The fluid leaving the heat pump 28 or the heat exchanger 30 is fed directly back to the thermal storage system 12 or fed back via a cooling means such as cooling tower 36. A seventh solenoid valve 38 and an eighth solenoid valve 40 control the return path fluid flow. An HVAC circulation pump 42 is provided between the output of the thermal storage system 12 and the fifth and sixth solenoid valves 32 and 34 for circulating the fluid in this loop. It is noted that solenoid valves 16 and 18 may be replaced by a single two-way valve and that the same is true for valves 22 and 24, valves 32 and 34, and valves 38 and 40.

The system of FIG. 1 is provided with three temperature sensors: the first sensor 44 monitors the temperature of the collector fluid at the outlet of the solar collection system 10; the second sensor 46 monitors the temperature of the thermal storage system 12; and the third sensor 48 monitors the temperature of the water in the domestic water heater. The temperatures measured by these sensors are used by the control system to control the fluid flow in the solar energy collection loop as will be explained hereinafter.

Figure 2:
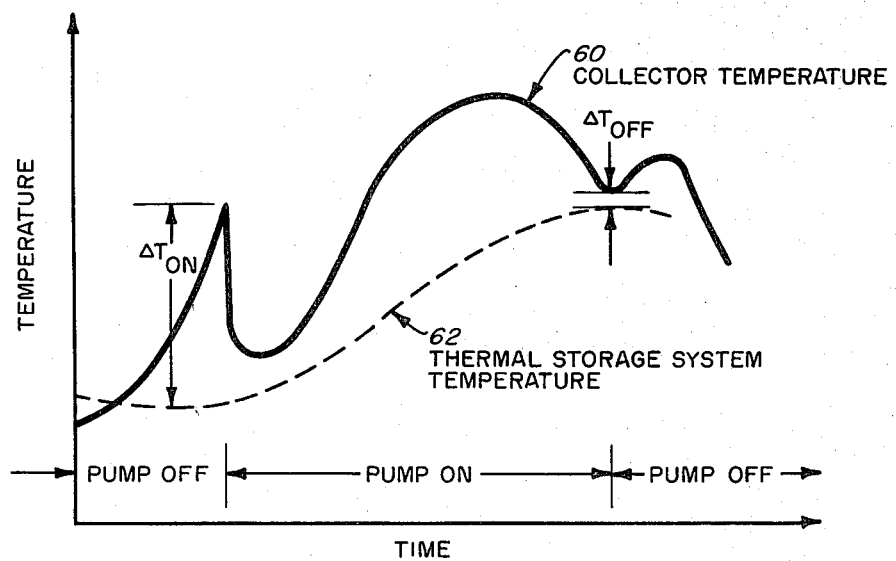
FIG. 2 illustrates the operating cycle of the solar energy collection loop.

Considering first the solar energy collection loop, the desired operation of the loop may be illustrated by reference to FIG. 2, where curve 60 represents the temperature of the collector fluid as measured by sensor 44 at the collector outlet and the dashed curve 62 represents the temperature of the thermal storage system 12 as measured by sensor 46. Initially, in the morning before the sun rises, the temperature of the fluid in the collector system 10 will be lower than (generally) the temperature of the storage system 12 and the collector circulation pump 26 will be unactivated so that the collector fluid does not circulate in the energy collection loop. When the sun rises, solar energy striking the collectors 10 will heat the still fluid in the collector. When the collector outlet temperature exceeds the temperature of the thermal storage system 12 by a preselected amount, $\Delta T_{ON}$ (typically about 25° F.), it is desired to activate the pump 26 which circulates the fluid between the solar collector 10 and the storage system 12 and to keep the pump running until the temperature of the storage system closely approaches that of the collector outlet. The pump 26 is deactivated when the temperature difference between the storage system 12 and the collector output decreases to less than a second preselected amount $\Delta T_{OFF}$ (typically about 5° F.).

When solar energy is used to heat the fluid in the thermal storage system 12, valves 16 and 22 are open and valves 18 and 24 are closed so that the pump 26 circulates the collector fluid through the thermal storage system 12. In general, the efficiency of the solar heating decreases as the temperature of the thermal storage system 12 increases. Thus, it becomes increasingly difficult to heat the storage system as the storage system temperature rises. For this reason, when the storage system temperature reaches a preselected high value, $T_H$ (typically about 140° F.), the solar collector would be used more effectively to heat cooler water such as that entering the domestic water heater 14. This is done by closing valves 16 and 22 and opening valves 18 and 24. If the temperature of the thermal storage system 12 drops below the preselected high value $T_H$ by a preselected temperature, such as $T_H - 5°$ F., the status of valves 16, 18, 22 and 24 is reversed, and the thermal storage system is recharged by the collector. During the period when the collector fluid is coupled to the domestic water heater 14, the operation of the pump 26 is determined by the difference in temperature between the temperature of the collector fluid and the temperature of the water in the domestic water heater 14 according to selected valves of $\Delta T_{ON}$ and $\Delta T_{OFF}$ as previously described.

The temperature of the fluid at the outlet of the solar collector 10 is also monitored to prevent damage to the collector system due to freezing. If the temperature of the collector fluid falls to a preset temperature (for example, about 35° F.), the circulating pump 26 is turned on and the fluid circulated through the thermal storage system 12 to warm the fluid and thus prevent freezing. Alternatively, the fluid may be drained from the collector system.

Considering now the desired operation of the heating, ventilation, and air conditioning loop, the solar assisted heat pump system of FIG. 1 operates to either heat or cool a building according to the mode of operation of the heat pump 28 which typically includes a heating or cooling mode control, a compressor on/off control, and a fan on/off control. The fan of the heat pump may be used to provide circulation of air in the building when the heat pump is unactivated. The heat pump 28 is responsive to signals from a controller such as a room thermostat (not shown in FIG. 1) which provides a heating mode or a cooling mode signal to determine the mode of operation of the heat pump. The thermostat also provides a signal indicating that there is a demand for heating or cooling to bring the building to the selected temperature.

Table 1 gives desired status of the heating, ventilation and air conditioning loop as a function of the temperature $T_S$ of the thermal storage system, whether the heat pump is in the heating or cooling mode, and whether there is a demand for heating or cooling based on the thermostat setting. Table 1 also includes the status of the solar energy collection loop. In Table 1 the letters V and P refer to valve and pump, respectively, (for example, V32 indicates valve 32) and an "X" indicates that the specified device is on (a valve is open) and an "O" indicates that the device is off.

TABLE 1

|  | V16, V22 & V38 | V18, V24 & V40 | Fan | Compressor | V32 | V34 | P42 | Aux. Heater |
|---|---|---|---|---|---|---|---|---|
| HEAT, NO DEMAND |
| $T_S \leq T_L$ | X | O | O | O | O | O | O | O |
| $T_L < T_S \leq T_M$ | X | O | O | O | O | O | O | O |
| $T_L < T_S \leq T_H$ | X | O | O | O | O | O | O | O |
| $T_S > T_H$ | O | X | O | O | O | O | O | O |
| HEAT, DEMAND |
| $T_S \leq T_L$ | X | O | X | O | O | O | O | X |
| $T_L < T_S \leq T_M$ | X | O | X | X | X | O | X | O |
| $T_M < T_S \leq T_H$ | X | O | X | O | O | X | X | O |
| $T_S > T_H$ | O | X | X | O | O | X | X | O |
| COOL, NO DEMAND |
| $T_S \leq T_L$ | O | X | O | O | O | O | O | O |
| $T_L < T_S \leq T_M$ | O | X | O | O | O | O | O | O |
| $T_M < T_S \leq T_H$ | O | X | O | O | O | O | O | O |
| $T_S > T_H$ | O | X | O | O | O | O | O | O |
| COOL, DEMAND |
| $T_S \leq T_L$ | O | X | X | O | O | X | X | O |
| $T_L < T_S \leq T_M$ | O | X | X | X | X | O | X | O |
| $T_M < T_S \leq T_H$ | O | X | X | O | O | O | O | O |
| $T_S > T_H$ | O | X | X | O | O | O | O | O |

There are two preselected control temperatures $T_L$, $T_M$ to which the temperature $T_S$ of the storage system is compared to determine the status of the various elements in the HVAC loop. In the heating mode, $T_L$ is the temperature at which the water in the thermal storage system 12 is too cold for effective operation of the heat pump 28. When the temperature $T_S$ of the thermal storage system 12 is less than or equal to $T_L$ and there is a heat demand, only the fan of the heat pump 28 is activated to provide ventilation, and any heat supplied to the building to be heated must be derived from an auxiliary heating system.

In the temperature range $T_L < T_S \leq T_M$, if there is a heat demand, the heat pump 28 is used to supply the heat to the building. For $T_L < T_S \leq T_M$, the fan and the compressor of the heat pump 28 are activated, the valves 32 and 38 are open, valves 34 and 40 are closed, and the circulation pump 42 is energized to circulate the thermal storage system water through the heat pump 28 and the return lines. For $T_S$ greater than $T_M$, the water from the thermal storage system 12 is fed through the heat exchanger 30 to supply the heat to the building. For $T_S$ greater than $T_M$, the valves 34 and 38 are open, valves 32 and 40 are closed, and the circulation pump 42 is energized to circulate the hot water through the heat exchanger. The fan of the heat pump 28 is also activated to circulate air across the heat exchanger 30. Typically values are $T_L = 50°$ F., $T_M = 110°$ F. and $T_H = 140°$ F.

In the cooling mode, if the water in the thermal storage system 12 is cool enough, $T_S \leq T_L$, water is circulated through the water-to-air heat exchanger 30 to provide cooling. If the water in the thermal storage system is of moderate temperature ($T_L < T_S \leq T_M$), the heat pump is used to cool the building (the refrigerant reversing valve in the heat pump is activated in the cooling mode). If the water in the thermal storage system 12 is too hot ($T_S$ greater than $T_M$), cooling is not possible although the fan will continue to run to provide air circulation. In the cooling mode of operation valve 38 is closed and valve 40 is opened so that water in the heat pump/heat exchanger loop is circulated through the cooling means 36 to reject heat to the atmosphere.

If the heat removed from the building is rejected to the thermal storage system 12, the temperature of the circulating water will rise. If the water becomes too warm ($T_S$ greater than $T_M$), the heat pump is shut off to prevent damage to the compressor motor. Obviously, circulating water from the thermal storage tank through the solar collectors during cooling mode operation will quickly raise the temperature of the water and severely restrict the amount of time the heat pump can operate in the cooling mode. For this reason, the solar collectors are used only to heat domestic water during the cooling mode operation (valves 18 and 24 are open and valves 16 and 22 are closed).

Figure 3:
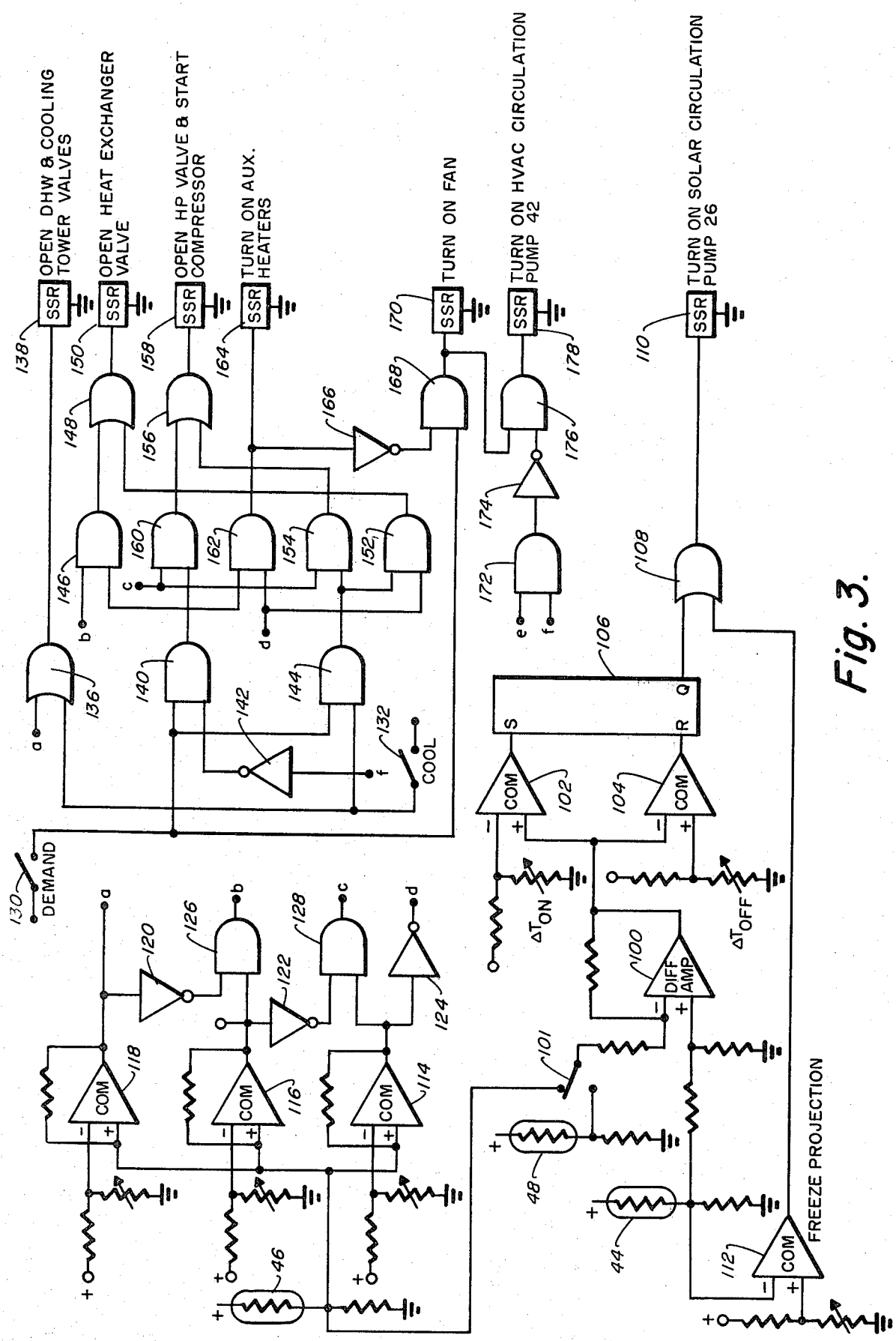
FIG. 3 is a schematic diagram of a control system according to the present invention.

Referring now to FIG. 3, there is shown a schematic diagram of a preferred embodiment of a control system according to the present invention for controlling the solar-assisted heat pump system of FIG. 1 in accordance with operating plan given in Table 1. Considering first the control of the solar energy collection loop, the first temperature sensor 44, which may be a conventional negative coefficient thermister, is coupled as part of a voltage divider to provide a signal proportional to the temperature of the fluid at the outlet of the solar collector system 10 and this signal is applied to the positive input of a differential amplifier 100. The second temperature sensor 46 (also a thermister) is coupled as part of a voltage divider to provide a signal proportional to the temperature of the thermal storage system 12 while the third temperature sensor 48 (also a thermister) is coupled as part of a voltage divider to provide a signal proportional to the temperature of the water in the domestic water heater 14. Switch 101 couples the signal from third sensor 48 to the negative input of the differential amplifier 100 when the heat pump system is in the cooling mode of operation or the temperature of the thermal storage system is greater than the preselected temperature $T_H$ (i.e., when the solar collector system is coupled to the domestic water heater 14). Otherwise the switch 101 couples the signal from the second sensor 46 to the negative input of the differential amplifier 100.

The output of the differential amplifier 100, which is a voltage signal proportional to the difference between the two input temperatures, is fed to the positive input of a first comparator 102 and the negative input to a second comparator 104. The first comparator 102 compares the output of the differential amplifier 100 with a signal corresponding to a preselected temperature difference ($\Delta T_{ON}$) between the two sensor being applied to the differential amplifier and produces a high output (logical 1) when the actual temperature difference is greater than the preselected temperature difference ($\Delta T_{ON}$). The output of the first comparator 102 is coupled to the set input of a set-reset flip-flop 106. A transistion of the output of the first comparator 102 to a high signal sets the Q output of flip-flop 106 which is coupled through an OR gate 108 to energize a solid state relay 110 which supplies power to activate collector circulation pump 26. Thus, the pump 26 is initially activated when the solar collector temperature (measured by sensor 44) is greater than the temperature applied to the negative input of differential amplifier 100 (i.e., either the thermal storage system temperature, sensor 46 or the domestic water heater temperature, sensor 48) by an amount larger than $\Delta T_{ON}$.

The second comparator 104 compares the output of the differential amplifier 100 with a signal corresponding to a second preselected temperature difference ($\Delta T_{OFF}$) between the two sensors being applied to the differential amplifier and produces a high output (logical 1) when the actual temperature difference is less than the second preselected temperature difference $\Delta T_{OFF}$ ($\Delta T_{OFF} < \Delta T_{ON}$). The transition of the output of the second comparator 104 to a high resets the Q output of flip-flop 106 which deenergizes the solid state relay 110 which deactivates the pump 26. Thus the pump 26, after initial activation, will remain on until the temperature difference between the collector fluid and either the thermal storage system temperature or the domestic water heater temperature is less than $\Delta T_{OFF}$, at which point the pump will be turned off.

The signal proportional to the solar collector temperature from sensor 44 is also coupled to the negative input of a third comparator 112 which has a signal proportional to a preselected temperature a little above the freezing point of the collector liquid as its positive input. The output of the comparator is coupled to an input of the OR gate 108. If the temperature at the collector outlet falls below the preselected temperature on the positive input to comparator 112, the output of the comparator 112 will become a logical 1 which will be transmitted through the OR gate 108 to energize the relay 110 and thereby activate the collector circulation pump 26.

Turning now to the control of the heaing, ventilation and air conditioning loop, the signal proportional to the temperature $T_S$ of the thermal storage system 10 from the second sensor 46 is coupled to the positive input of each of three comparators 114, 116 and 118 where it is compared to signals proportional to the three preselected temperatures $T_H$, $T_M$ and $T_L$ ($T_H > T_M > T_L$) which are applied to the negative inputs. Comparator 114 produces a logical one output when $T_S$ is greater than $T_L$; comparator 116 produces a logical one output when $T_S$ is greater than $T_M$; comparator 118 produces a logical one output when $T_S$ is greater than $T_H$. The comparators 114, 116, and 118 are provided with feedback networks which provide hysteresis about the set points. The amount of hysteresis corresponds to about 5° F. and prevents control system "chatter." Thus, for example, comparator 114 will switch to a logical one output when the temperature $T_S$ increases to greater than $T_H+5°$ F. and will switch to a logical zero output when the temperature $T_S$ decreases to less than $T_H-5°$ F.

The outputs of the comparators 114, 116 and 118 are coupled through a network of inverters 120, 122 and 124 and AND gates 126 and 128 to produce the following truth table for terminals a, b, c and d.

| Temperature | Terminal | | | |
|---|---|---|---|---|
| | a | b | c | d |
| $T_S > T_H$ | 1 | 0 | 0 | 0 |
| $T_M < T_S \leq T_H$ | 0 | 1 | 0 | 0 |
| $T_L < T_S \leq T_M$ | 0 | 0 | 1 | 0 |
| $T_S \leq T_L$ | 0 | 0 | 0 | 1 |

The signals on terminals a, b, c and d together with the demand signal 130 and the cooling mode signal 132, from the thermostatic control, are fed to a logic network which energizes a plurality of solid state relays to control the solar-assisted heat pump system of FIG. 1 as described in Table 1.

The signal on terminal a, which is high when the temperature $T_S$ of the thermal storage system 12 is greater than $T_H$, is coupled to one input of an OR gate 136 which has the cooling mode signal 132 as its other input. The output of OR gate 136 is coupled to control a plurality of solid state relays, represented by relay 138, which operate various elements of FIG. 1. A high signal on the output of OR gate 136 will produce the following operations: disconnect the solar collector system 10 from the thermal storage system 12 (close solenoid valves 16 and 22); connect the solar collector system 10 to the domestic water heater 14 (open solenoid valves 18 and 24); engage switch 101 to connect the domestic water heater temperature sensor 48 to the negative input of differential amplifier 100; and couple the fluid flow in the heating, ventilation, air conditioning loop through the cooling tower 36 (open solenoid valve 40 and close solenoid valve 38). These operations will of course be reversed when the output of OR gate 136 goes low when the cooling mode signal is not present and the temperature of the thermal storage system 12 falls below $T_H$ (minus the hysteresis of 5° F.).

The demand signal 130 is coupled to one input of an AND gate 140 which has its other input coupled to the cooling mode signal 132 via an inverter 142 so that AND gate 140 produces a high output when there is a demand signal and the cooling mode signal is not present (i.e., the heat pump 28 is in the heating mode of operation). The demand signal 130 and the cooling mode signal 132 are also coupled to the two inputs of another AND gate 144 which produces a high output when there is a demand signal and the heat pump is in the cooling mode of operation.

The signal on terminal b, which is high when the temperature $T_S$ of the thermal storage system 12 is greater than $T_M$ and less than or equal to $T_H$, is coupled to one input of an AND gate 146 which has its other input coupled to the output of AND gate 140. The output of AND gate 146 is coupled to an OR gate 148 which has its output coupled to control solid state relay 150. A high on the output of OR gate 148 energizes the relay 150 which opens solenoid valve 34 to allow the fluid to circulate through the heat exchanger 30. The other input to OR gate 148 is the output of an AND gate 152 which has as its two inputs, the output of AND gate 144 and the signal on terminal d, which is high when the temperature $T_S$ of the thermal storage system 12 is less than or equal to $T_L$. Thus a demand for cooling which causes a high signal on the output of AND gate 144 and a thermal storage temperature $T_S$ less than or equal to $T_L$ will also energize the solid state relay 150 thereby opening solenoid valve 34.

The output of AND gate 144 is also coupled to an input of an AND gate 154 which has as its other input the signal on terminal c which is high when $T_S$ is greater than $T_L$ and less than or equal to $T_M$. The output of AND gate 154 is coupled to OR gate 156 which has its output coupled to control a solid state relay 158. A high on the output of OR gate 156 energizes the relay 158 which opens the solenoid valve 32 to allow the fluid to circulate through the heat pump 28 and activates the compressor of the heat pump. The other input to OR gate 156 is the output of an AND gate 160 which has as its two inputs the output of AND gate 140 and the signal in terminal c, which is high when $T_S$ is greater than $T_L$ and less than or equal to $T_M$. Thus a demand for heating or cooling (a high signal on the output of AND gate 140 and 144, respectively) and a thermal storage temperature $T_S$ greater than $T_L$ and less than or equal to $T_M$ will energize the solid state relay 158, thereby opening valve 32 and activating the heat pump compressor.

The output of AND gate 140 is also coupled to an AND gate 162 which has as its other input the signal on terminal d which is high when $T_S$ is less than or equal to $T_L$. The output of AND gate 162 is coupled to control a solid state relay 164 which may be used to activate auxiliary heaters when the temperature of the thermal storage system is too low for effective heating.

The output of the AND gate 162 is also coupled via an inverter 166 to one input of an AND gate 168 which has the demand signal 130 as its other input. A high on the output of AND gate 168 is coupled to control a solid state relay 170 which activates the fan on the heat pump to provide ventilation when there is a demand for heating or cooling.

The circuit for controlling the HVAC circulation pump 42 includes an AND gate 172 having the cooling mode signal 132 and the output of the comparator 116 (logical 1 when $T_S$ greater than $T_M$) as its two inputs. The output of the AND gate 172 is coupled via an inverter 174 to an input of an AND gate 176 which has the output of AND gate 168 as its other input. The output of AND gate 176 is coupled to a solid state relay 178 which controls the circulation pump 42. A high on the output of the AND gate 176 energizes the solid state relay 178 which activates the circulation pump 42. Thus the circulation pump 42 is activated when there is (1) a demand for heating and $T_S$ greater than $T_L$ or (2) a demand for cooling and $T_S$ is less than or equal to $T_M$.

Obviously, many modifications and variations of the present invention are possible in the light of the above teachings. It is therefore to be understood that within the scope of the appended claims the invention may be practiced otherwise than as specifically described.

What is claimed is:

1. In a solar-assisted heating and cooling system which includes a solar energy collection and storage system having a solar collector system, a thermal storage system, and a first pump means for circulating collector fluid between the solar collector system and the thermal storage system, and which includes a heating, ventilating, and air conditioning system having a fluid-to-air heat pump having a heating mode and a cooling mode of operation, a fluid-to-air heat exchanger, a second pump means for circulating a heat storage fluid from the thermal storage system to the heat pump or the heat exchanger, and valve means for directing the flow of the heat storage fluid to the heat pump or the heat exchanger, a fan means for circulating air in said heating and cooling system, and a thermostatic control for selecting either the heating mode or the cooling mode of operation of the system and for providing a signal indicating a demand for heating or cooling, a control system comprising:

a. first temperature sensing means for sensing the temperature of the collector fluid at the outlet of the solar collector system;

b. second temperature sensing means for sensing the temperature of the storage fluid in the thermal storage system;

c. means responsive to said first and second temperature sensing means for activating the first pump means when the temperature sensed by said first temperature sensing means is a preselected amount greater than the temperature sensed by said second temperature sensing means and for inactivating the first pump means when the temperature sensed by said first temperature sensing means is a second lesser preselected amount greater than the temperature sensed by said second temperature sensing means;

d. means for comparing the temperature sensed by said second temperature sensing means with a first preselected temperature, a second preselected temperature, and a third preselected temperature, the first preselected temperature being greater than the second preselected temperature, and the second preselected temperature being greater than the third preselected temperature, and providing a first output when the sensed temperature is greater than the first preselected temperature, a second output when the sensed temperature is less than or equal to the first preselected temperature and greater than the second preselected temperature, a third output when the sensed temperature is less than or equal to the second preselected temperature and greater than the third preselected temperature, and a fourth output when the sensed temperature is less than or equal to the third preselected temperature;

e. logic means responsive to said first, second, third, and fourth output signals from said means for comparing and responsive to the signals from the thermostatic control indicating the heating mode, the cooling mode, and demand for heating or cooling;

f. said logic means responsive to the combination of said heating mode signal, said demand for heating signal and said first or second output signal from said means for comparing for actuating the valve means to couple the thermal storage system to the heat exchanger, for activating the second pump means to circulate the heat storage fluid from the thermal storage system through the heat exchanger and for activating the fan for circulating air across the heat exchanger;

g. said logic means responsive to the combination of said heating mode signal, said demand for heating signal and said third signal from said means for comparing for actuating the valve means to couple the thermal storage system to the heat pump, for activating the second pump means for circulating the heat storage fluid from the thermal storage system through the heat pump, for activating the compressor of the heat pump and for activating the fan for circulating air through said heat pump;

h. said logic means responsive to the combination of said heating mode signal, said demand for heating signal, and said fourth signal from said means for comparing for activating said fan to circulate air to provide ventilation;

i. said logic means responsive to the combination of the cooling mode signal, the demand for cooling signal and the first signal or second signal from said means for comparing for activating the fan to circulate air to provide ventilation;

j. said logic means responsive to the combination of the cooling mode signal, the demand for cooling signal and the third signal from said means for comparing for actuating the valve means to couple the thermal storage system to the heat pump, for activating the compressor of the heat pump, for activating the fan for circulating air through the heat pump, and for activating the second pump means for circulating the heat storage fluid from the thermal storage system through the heat pump;

k. said logic means responsive to the combination of the cooling mode signal, the demand for cooling signal and the fourth signal for actuating the valve means to couple the thermal storage system to the heat exchanger, for activating the second pump means to circulate the heat storage fluid from the thermal storage system through the heat exchanger, and for activating the fan for circulating air across the heat exchanger;

l. said heating, ventilating, and air conditioning system including a cooling means to reject heat from the storage fluid into the outside atmosphere and second valve means for directing the flow of the heat storage fluid from the heat pump or the heat exchanger to the cooling means and from the cooling means back to the thermal storage system, and said logic means of said control system being further responsive to said cooling mode signal or said first output signal from said means for comparing for actuating the second valve means for directing the flow of the heat storage fluid to the cooling means and activating the second circulating pump means for circulating the heat storage fluid.

2. Apparatus as recited in claim 1 wherein the solar-assisted heating and cooling system includes a domestic water heater and third valve means for directing the flow of the collector fluid to the thermal storage system or the domestic water heater, and wherein said logic means of said control system is further responsive to said cooling mode signal or said first output signal from said means for comparing for actuating said third means for directing the flow of the collector fluid to the domestic water heater.

3. Apparatus as recited in claim 1 further comprising:
a. means for comparing the temperature sensed by said first temperature sensing means with a signal corresponding to a temperature slightly greater than the freezing point of the collector fluid, and
b. means for activating the first circulation pump means when the temperature sensed by said first temperature sensing means is less than the freezing point of the collector fluid.

4. Apparatus as recited in claim 1 wherein said means responsive to said first and second temperature sensing means for activating the first pump means comprises:

a. differential amplifier means having said first temperature sensing means coupled to its positive input and having said second temperature sensing means coupled to its negative input, and an output proportional to the difference between inputs;

b. first comparator means having the output of said differential amplifier means coupled to its positive input and having a signal corresponding to a first temperature difference between the inputs to said differential amplifier means coupled to its negative input, the output of said first comparator means being a logical one when the signal on its positive input is greater than the signal on its negative input;

c. second comparator means having the output of said differential amplifier means coupled to its negative input and having a signal corresponding to a second lesser temperature difference between the inputs to said differential amplifier means coupled to its positive input, the output of said first comparator means being a logical one when the signal on its positive input is greater than the signal on its negative input;

d. flip-flop means coupled to the output of said first and second comparator means for providing a logical one output on the transition of the output of said first comparator means from a logical zero to a logical one and for providing a logical zero output on the transition of the output of said second comparator means from a logical zero to a logical one; and e. first relay means coupled to the output of said flip-flop means for activating said first pump means when the output of said flip-flop means is a logical one.

5. Apparatus as recited in claim 4 further comprising third comparator means having the output from said first temperature sensing means coupled to its negative input and a signal corresponding to a temperature slightly greater than the freezing point of the collector fluid coupled to its negative input, the output of the third comparator being a logical one when the signal on its positive input is greater than the signal on its negative input, the output of said third comparator being coupled to said first relay means for activating said first relay means for activating said first pumping means when the output of said third comparator is a logical one.

6. Apparatus as recited in claim 4 further comprising:

a. third temperature sensing means for sensing the temperature of the water in the domestic water heater; and b. switch means for selectively coupling said third temperature sensor or said second temperature sensoring means to the negative input of said differential amplifier means, said switch means coupling said third temperature sensing means to the negative input to the differential amplifier in response to either the cooling mode signal or the first output from the means for comparing.

7. Apparatus as recited in claim 1 wherein said first and second temperature sensing means include a thermister.

8. Apparatus as recited in claim 6 wherein said third temperature sensing means includes a thermister.

9. Apparatus as recited in claim 1 wherein said means for comparing includes:

a. first comparator means having its positive input coupled to the output of said second temperature sensing means and its negative input coupled to a signal proportional to said first preselected temperature, the output of said first comparator means switching from a logical zero to a logical one when the signal on its positive input is greater than the signal on its negative input;

b. second comparator means having its positive input coupled to the output of said second temperature sensing means and its negative input coupled to a signal proportional to said second preselected temperature, the output of said second comparator means switching from a logical zero to a logical one when the signal on its positive input is greater than the signal on its negative input; and c. third comparator means having its positive input coupled to the output of said second temperature sensing means and its negative input coupled to a signal proportional to said third preselected temperature, the output of said third comparator means switching from a logical zero to a logical one when the signal on its positive input is greater than the signal on its negative input.

10. Apparatus as recited in claim 9 wherein the output of said first, second and third comparator means are fed back through a resistance to the positive input of the first, second and third comparator means, respectively, to provide hysteresis in the switching of said comparator.

* * * * *